United States Patent Office 2,731,438
Patented Jan. 17, 1956

2,731,438

TRIAZINE-ALDEHYDE-POLYSILOXANE RESINOUS COMPOSITION AND PROCESS FOR PREPARING

Martha K. Layman, Stamford, Conn., assignor to American Cyanamid Company, New York, N. Y., a corporation of Maine No Drawing. Application May 4, 1954,
Serial No. 427,667

13 Claims. (Cl. 260—45.2)

This invention relates to resinous compositions of matter. More particularly this invention relates to resinous compositions of matter comprising triazine-aldehyde condensation products, which will be discussed more fully hereinbelow, and a partially condensed phenyl siloxane. Further, this invention relates to the resinous compositions, their method of preparation and articles produced therefrom.

Aminoplastic resins, particularly those prepared from substituted triazine, are noted for their excellent color, hardness, solvent and chemical resistance. In view of these properties, they find many uses in such applications as the laminating and molding industries. The triazine-aldehyde condensation products that find employment in the present invention are prepared from a triazine represented by the general formula

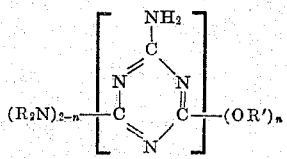

wherein $n$ is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; $R^1$ is a member selected from the group consisting of an ethylenically unsaturated hydrocarbon radical containing from 3 to 4 carbon atoms and an alkyl radical containing from 4 to 8 carbon atoms; when $n$ is 0 at least one R is an ethylenically unsaturated hydrocarbon radical containing from 3 to 4 carbon atoms; when $n$ is 1 at least one of the member R and $R^1$ is an ethylenically unsaturated hydrocarbon radical containing from 3 to 4 carbon atoms; and when $n$ is 2 at least one $R^1$ is an ethylenically unsaturated hydrocarbon radical containing from 3 to 4 carbon atoms.

Examples of alkyl radicals represented by R and $R^1$ in the general formula are such as N-butyl, tertiary butyl, hexyl, heptyl, octyl, tertiary octyl and the like. Illustrative examples of ethylenically unsaturated hydrocarbons represented by R and $R^1$ in the general formula are such as allyl, methallyl, 1-butenyl, 2-butenyl and the like. Triazines represented by the general formula are applicable to a wide range of compounds. Among the many compounds that may be employed and are represented by the general formula are such as the following illustrative examples: N,N-diallyl melamine; monoallyl melamine; N,N-dimethallyl melamine; monomethallyl melamine; 2-butenyl melamine; 3-butenyl melamine; N-butyl, N-allyl melamine; N-octyl, N-methallyl melamine; N,$N^1$-diallyl melamine; 2-allyl, 4N-butyl, 6-amino, 1,3,5-triazine; N,N,$N^1$,$N^1$-(tetramethallyl) melamine; 2-methallyl, 4N-heptyl, 6-amino, 1,3,5-triazine; N-octyl, N-allyl, $N^1$,$N^1$-diallyl melamine; alloxy melamine; 2-alloxy, 4-butyl, 6-amino, 1,3,5-triazine; 2-methalloxy, 4N,N-diallyl, 6-amino, 1,3,5-triazine; 2-alloxy, 4-octyl, 6-amino, 1,3,5-triazine; 2-methalloxy, 4N,N-dihexyl, 6-amino, 1,3,5-triazine; 2-allyl, 4-butyloxy, 6-amino, 1,3,5-triazine; 2-methallyl, 4-dioctyl, 6-amino, 1,3,5-triazine; 2-butenyl, 4-alloxy, 6-amino, 1,3,5-triazine; dialloxy aminotriazine; 2-alloxy, 4-butyloxy, 6-amino, 1,3,5-triazine; 2-methalloxy, 4-octyloxy, 6-amino, 1,3,5-triazine; N-alloxy, N-pentyl, $N^1$-methalloxy aminotriazine.

It has been previously suggested that aminoplastic resin be combined with certain polysiloxane resinous compositions to produce novel materials. However, in each instance it is necessary to have ingredients other than the triazine resin and the polysiloxane resin present in order to insure compatibility, acceptable cure characteristics, improved product qualities and the like. For instance, nonalkylated triaminotriazine resinous compositions are incompatible with the polysiloxane. While alkylated triazine resinous compositions are compatible with the polysiloxane, the resinous material formed requires an extended period of time for cure and the cured material does not possess any appreciable solvent resistant characteristics. I have now found that a triazine-aldehyde condensation product prepared from triazines represented by the general formula set forth above is compatible with a partially condensed polysiloxane, which will be discussed more fully hereinbelow. No modifying ingredient is required to insure the compatibility of the components of the resinous composition of my invention. The employment of the composition as, for example, in the preparation of the decorative or protective coatings will cure to an insoluble and infusible state within a decreased period of time and at lower temperatures than were hereinbefore employed.

It is an object of my invention to prepare resinous compositions from triazine-aldehyde condensation products as represented by the general formula with partially condensed polysiloxane resinous compositions. It is a further object of my invention to employ these resinous materials in the production of decorative and protective coatings, laminations and the like. These and other objects of my invention will be discussed more fully hereinbelow.

The polysiloxane resinous compositions that find employment in my invention are methylphenyl siloxane derivatives. These polysiloxanes may be prepared by any method well known in the art. A distinguishing feature of the polysiloxanes herein used is the fact that the material contains uncondensed hydroxy groups. The hydroxy groups present in the polysiloxanes insure compatibility of the resin with the aldehyde condensation product of the compound represented by the general formula.

A typical method of preparing the polysiloxanes herein used is to mix methyl silicon trichloride with phenyl silicon trichloride in substantially equal molar proportion in ether and hydrolyze the same by pouring upon ice. The partial condensation product of the hydrolysis product of the mixed organo-silicon halides is obtained after the ether solution is separated, washed and evaporated. If desired, a dehydrating agent may be present in order to expedite the dehydration or cocondensation of the silicols formed. The amount of a dehydrating agent employed may vary widely depending upon such things as the temperature of dehydration, the rapidity of dehydration desired, the extent of dehydration desired, among others. Preferably, the amount of the dehydrating agent may be present from about 0.1% to about 10% by weight based on the weight of the polysiloxane being dehydrated. Suitable dehydrating agents that may find employment and are well known in the art are such as the esters of boric acid, e. g., methyl borate, oxides, halides and oxyhalides of phosphorus, e. g., phosphorus pentaoxide, phosphorus trichloride, phosphorus oxychloride and the like. In any event, the degree and rapidity of dehydration is controlled so that uncondensed hydroxy groups remain in the polysiloxane.

While the exact structure of the polysiloxane utilized in the invention is not known with certainty, it is believed that the structure may be one of the following

wherein R may be either a methyl or phenyl group. It is also possible to have present in the polysiloxane polymer ring structure as follows:

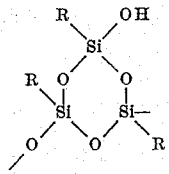

wherein again R may be either a methyl or phenyl group. I am not to be limited by the above discussion of the structure of the polysiloxane molecule but have set forth the above structure of the polysiloxanes only by way of explanation and illustration.

The polysiloxane molecule may have recurring silicon atoms having attached thereto methyl and phenyl groups or in some instances groups of silicon atoms having either methyl or phenyl groups attached thereto are possible. Usually the polymeric polysiloxane will preferably have in its molecule an average of about one total methyl and phenyl group per silicon atom. However, by selecting the organo-silicon halide to be hydrolyzed and then co-condensed to form the polymeric material, it is possible to obtain polysiloxane molecules having an average of from about one to not more than two total methyl and phenyl groups per silicon atom. When polysiloxane molecules are utilized having greater than one total methyl or phenyl group present per silicon atom, care must be taken during the dehydration thereof to insure uncondensed hydroxy groups remaining in the molecule.

The aldehyde employed in preparing the condensation product with the triazine represented by the general formula is dependent upon many factors, particularly economic considerations. While I prefer to use the aldehydic reactant formaldehyde or compounds engendering formaldehydes such as p-formaldehyde, trioxane, etc., other aldehydes that may also be employed are such as acetaldehyde, propionaldehyde, heptaldehyde, furfural, hydroxyaldehydes, etc., mixtures thereof or mixtures of formaldehyde with such aldehydes.

In the preparation of the condensation product of the aldehyde with the triazine represented by the general formula, the molar ratio of the aldehyde to such compound may vary within the range of from 1.0:1.0 to 4.0:1.0, respectively. It is preferred, however, that the molar ratio of the aldehyde to the compound represented by the general formula be within the range of from about 1.5:1.0 to about 2.5:1.0, respectively.

In order that those skilled in the art may more fully understand the inventive concept herein presented, the following example is given by way of illustration and not limitation. All parts are by weight.

A typical condensation product is prepared from diallyl melamine and formaldehyde. 258 parts of N,N-diallyl melamine and 206 parts of a 37% solution of formaldehyde are charged to a suitable reaction vessel and the slurry pH adjusted to 7.0. The reaction mixture is then heated to reflux in a period of about an hour and held at this temperature for an additional hour. At this time the pH is adjusted to 8.1 while cooling the mixture to about 60° C. The mixture is then concentrated at a pressure of 240 millimeters of mercury for about an hour until a temperature of 110° C. is obtained. The pressure is then lowered to 50 millimeters of mercury for an additional hour and the temperature allowed to reach 143° C. After the resin has been vacuum concentrated, it is poured into a shallow tray and then ground before further use.

The condensation reaction of the aldehyde with the triazine represented by the general formula may be carried out at elevated temperatures, at atmospheric, subatmospheric, or superatmospheric pressure and under neutral, alkaline or acidic conditions. It is preferred that the reaction be carried out under neutral to mildly acid conditions rather than under strongly alkaline conditions. Any substance which yields an alkaline or acidic solution may be employed in obtaining alkaline or acidic solution for the condensation reaction. Examples of alkaline substances that may be employed are such as sodium, potassium or calcium hydroxide; sodium or potassium carbonate; a mono-, di- or tri-alkanol amino such as monoethanol amine, etc. Acidic substances that may be employed are, for example, inorganic acids such as hydrochloric acid, sulfuric acid or acid salts such as sodium acid sulfate, monosodium phosphate, etc. Certain organic acids or the acid salts thereof such as acetic, lactic, etc., may also be used. Mixtures of acids and/or acid salts may be utilized as desired.

The following table sets forth the effect on cure rate and the properties of a partially condensed polysiloxane containing various parts of diallyl melamine-formaldehyde condensation product prepared in accordance with the example set forth above.

| Parts DAM[1] Resin Based on Total Resin Mix | Minimum Cure Time (Minutes) | Hot Hardness | 60 Minute Cure at 150° C. | | Xylene Resistance, 3 hr. Soak | Hot Hardness | 60 Minute Cure at 200° C. | | Xylene Resistance, 3 hr. Soak |
| | | | Water Resistance | | | | Water Resistance | | |
| | | | 30' Boil | 16 hr. Soak | | | 30' Boil | 16 hr. Soak | |
| 0 | >90 | Tacky | Poor | OK | NG[2] | Soft | Fair | OK | NG. |
| 10 | 60 | V. Sl. Soft | do | OK | NG | V. Sl. Soft | OK | OK | NG. |
| 50 | 30–60 | OK | OK | OK | OK | OK | OK | OK | OK. |
| 75 | 30 | OK | OK | OK | OK | OK | OK | OK | OK. |
| 90[3] | <30 | OK | OK | OK | OK | OK | OK | OK | OK. |

[1] Diallyl melamine/formaldehyde resin.
[2] Not good.
[3] Comparable results were obtained for 30 minute cure.

In order to obtain the increased solvent resistance of the resinous material and the improved cure characteristics, from about 10% to about 90% by weight of the resinous composition may comprise the triazine-aldehyde condensation, the balance being the partially condensed polysiloxane. It is preferred, however, that the amount of the triazine-aldehyde condensation product present in the resinous composition be within the order of from about 15% to about 50% by weight based on the total weight. Catalyst and drying agents such as are well known in the art may be present in the composition during the cure thereof. Thus, from about 0.5% to about 4% by weight, preferably 1% to 3% by weight, based on the weight of the triazine condensation product of a catalyst such as benzoic acid, phthalic anhydride and the like may be present. Suitable dryers that may be employed are the naphthenates and the octoates of zinc, iron, cobalt, manganese, lead etc. These dryers may be present in the amount of from about 0.1% to 1.0% by weight, preferably about 0.5% by weight, based on the weight of the partially condensed polysiloxane. When the material is to be employed in the production of protective or decorative films, laminates and the like, the resinous composition is preferably employed in a suitable solvent such as xylene, toluene-ethanol mixtures and the like.

As previously indicated, the resinous compositions of my invention may find employment in the production of decorative and protective coatings and also in the production of laminations. Other uses of the resinous compositions will be apparent to those skilled in the art and a few of these uses may be indicated as, for example, bonding of mica, glass, asbestos and the like; for weather and weather resistant coatings; water repellent finishes; paints, enamels and varnishes. In order to obtain colored finishes, dyes and pigments, other colorants may be introduced into the composition.

I claim:

1. A resinous composition of matter comprising from about 10% to about 90% by weight of the reaction product of an aldehyde and a compound represented by the formula:

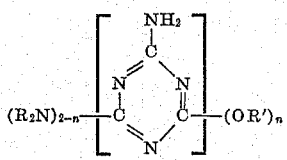

wherein $n$ is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R′ is a member selected from the group consisting of an ethylenically unsaturated hydrocarbon radical containing from 3 to 4 carbon atoms and an alkyl radical containing from 4 to 8 carbon atoms and at least one of the members R and R′ is an ethylenically unsaturated hydrocarbon radical containing from 3 to 4 carbon atoms; and from about 90% to about 10% by weight of a partially condensed polysiloxane containing attached to the silicon atoms methyl and phenyl substituents.

2. A resinous composition of matter comprising from about 10% to about 90% by weight of the reaction product of formaldehyde and a compound represented by the formula:

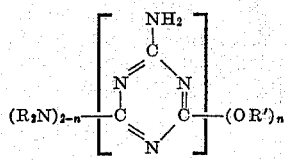

wherein $n$ is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R′ is a member selected from the group consisting of an ethylenically unsaturated hydrocarbon radical containing from 3 to 4 carbon atoms and an alkyl radical containing from 4 to 8 carbon atoms and at least one of the members R and R′ is an ethylenically unsaturated hydrocarbon radical containing from 3 to 4 carbon atoms; and from about 90% to about 10% by weight of a partially condensed polysiloxane containing attached to the silicon atoms methyl and phenyl substituents.

3. A resinous composition of matter comprising from about 15% to about 50% by weight of the reaction product of formaldehyde and a compound represented by the formula:

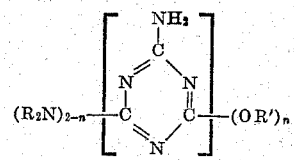

wherein $n$ is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R′ is a member selected from the group consisting of an ethylenically unsaturated hydrocarbon radical containing from 3 to 4 carbon atoms and an alkyl radical containing from 4 to 8 carbon atoms and at least one of the members R and R′ is an ethylenically unsaturated hydrocarbon radical containing from 3 to 4 carbon atoms; and from about 85% to about 50% by weight of a partially condensed polysiloxane containing attached to the silicon atoms methyl and phenyl substituents.

4. A resinous composition of matter comprising from about 10% to about 90% by weight of the reaction product of from about 1.0 to about 4.0 mols of formaldehyde per mol of a compound represented by the formula:

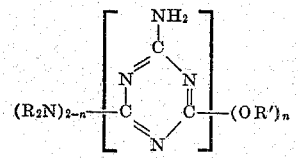

wherein $n$ is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R′ is a member selected from the group consisting of an ethylenically unsaturated hydrocarbon radical containing from 3 to 4 carbon atoms and an alkyl radical containing from 4 to 8 carbon atoms and at least one of the members R and R′ is an ethylenically unsaturated hydrocarbon radical containing from 3 to 4 carbon atoms; and from about 90% to about 10% by weight of a partially condensed polysiloxane containing attached to the silicon atoms methyl and phenyl substituents.

5. A resinous composition of matter comprising from about 15% to about 50% by weight of the reaction product of from about 1.5 to about 2.5 mols of formaldehyde per mol of a compound represented by the formula:

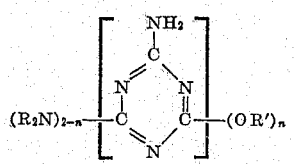

wherein $n$ is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R′ is a member selected from the group consisting of an ethylenically unsaturated hydrocarbon radical containing from 3 to 4 carbon atoms and an alkyl radical containing from 4 to 8 carbon atoms and at least one of the members R and R′ is an ethylenically unsaturated hydrocarbon radical containing from 3 to 4 carbon atoms; and from about 85% to about 50% by weight of a partially condensed polysiloxane containing attached to the silicon atoms methyl and phenyl substituents.

6. A resinous composition of matter comprising from about 10% to about 90% by weight of the reaction product of from about 1.0 to about 4.0 mols of formaldehyde per mol of N,N-diallyl melamine and from about 90% to about 10% by weight of a partially condensed polysiloxane containing attached to the silicon atoms methyl and phenyl substituents.

7. A resinous composition of matter comprising from about 15% to about 50% by weight of the reaction product of from about 1.5 to about 2.5 mols of formaldehyde per mol of N,N-diallyl melamine and from about 85% to about 50% by weight of a partially condensed polysiloxane containing attached to the silicon atoms methyl and phenyl substituents.

8. A process for preparing resinous coatings which comprises casting a film of a resinous composition comprising from about 10% to about 90% by weight of the reaction product of formaldehyde and a compound represented by the formula:

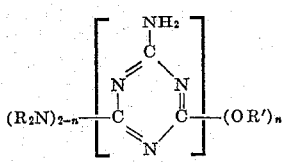

wherein *n* is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R' is a member selected from the group consisting of an ethylenically unsaturated hydrocarbon radical containing from 3 to 4 carbon atoms and an alkyl radical containing from 4 to 8 carbon atoms and at least one of the members R and R' is an ethylenically unsaturated hydrocarbon radical containing from 3 to 4 carbon atoms; and from about 90% to about 10% by weight of a partially condensed polysiloxane containing attached to the silicon atoms methyl and phenyl substituents and curing said film by the application of heat.

9. A process for preparing resinous coatings which comprises casting a film of a resinous composition comprising from about 15% to about 50% by weight of the reaction product of formaldehyde atnd a compound represented by the formula:

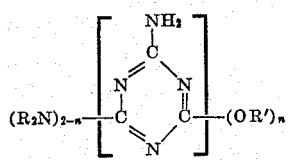

wherein *n* is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R' is a member selected from the group consisting of an ethylenically unsaturated hydrocarbon radical containing from 3 to 4 carbon atoms and an alkyl radical containing from 4 to 8 carbon atoms and at least one of the members R and R' is an ethylenically unsaturated hydrocarbon radical containing from 3 to 4 carbon atoms; and from about 85% to about 50% by weight of a partially condensed polysiloxane containing attached to the silicon atoms methyl and phenyl substituents and curing said film by the application of heat.

10. A processs for preparing resinous coatings which comprises casting a film of a resinous composition comprising from about 10% to about 90% by weight of the reaction product of from about 1.0 to about 4.0 mols of formaldehyde per mol of a compound represented by the formula:

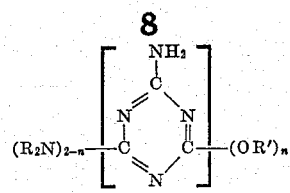

wherein *n* is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R' is a member selected from the group consisting of an ethylenically unsaturated hydrocarbon radical containing from 3 to 4 carbon atoms and an alkyl radical containing from 4 to 8 carbon atoms and at least one of the members R and R' is an ethylenically unsaturated hydrocarbon radical containing from 3 to 4 carbon atoms; and from about 90% to about 10% by weight of a partially condensed polysiloxane containing attached to the silicon atoms methyl and phenyl substituents and curing said film by the application of heat.

11. A process for preparing resinous coatings which comprises casting a film of a resinous composition comprising from about 15% to about 50% by weight of the reaction product of from about 1.5 to about 2.5 mols of formaldehyde per mol of a compound represented by the formula:

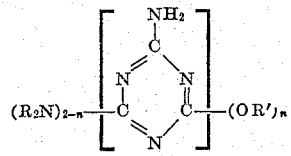

wherein *n* is an integer of from 0 to 2; R is a member selected from the group consisting of hydrogen, an ethylenically unsaturated hydrocarbon radical containing from 3 to 4 carbon atoms and an alkyl radical containing from 4 to 8 carbon atoms; R' is a member selected from the group consisting of an ethylenically unsaturated hydrocarbon radical containing from 3 to 4 carbon atoms and an alkyl radical containing from 4 to 8 carbon atoms and at least one of the members R and R' is an ethylenically unsaturated hydrocarbon radical containing from 3 to 4 carbon atoms; and from about 85% to about 50% by weight of a partially condensed polysiloxane containing attached to the silicon atoms methyl and phenyl substituents and curing said film by the application of heat.

12. A process for preparing resinous coatings which comprises casting a film of a resinous composition comprising from about 10% to about 90% by weight of the reaction product of from about 1.0 to about 4.0 mols of formaldehyde per mol of N,N-diallyl melamine and from about 90% to about 10% by weight of a partially condensed polysiloxane containing attached to the silicon atoms methyl and phenyl substituents and curing said film by the application of heat.

13. A process for preparing resinous coatings which comprises casting a film of a resinous composition comprising from about 10% to about 90% by weight of the reaction product of from about 1.5 to about 2.5 mols of formaldehyde per mol of N,N-diallyl melamine and from about 85% to about 50% by weight of a partially condensed polysiloxane containing attached to the silicon atoms methyl and phenyl substituents and curing said film by the application of heat.

References Cited in the file of this patent

UNITED STATES PATENTS

| | | |
|---|---|---|
| 2,258,222 | Rochow | Oct. 7, 1941 |
| 2,389,491 | Dunlap et al. | Nov. 20, 1945 |
| 2,500,842 | MacKenzie et al. | Mar. 14, 1950 |
| 2,559,122 | Hessel et al. | July 3, 1951 |